United States Patent [19]

Brill-Edwards

[11] 4,382,435
[45] May 10, 1983

[54] ROOFING PANELS

[75] Inventor: Kenneth O. P. Brill-Edwards, Morriston, Wales

[73] Assignee: Cresent Roofing Company Limited, Swansea, Wales

[21] Appl. No.: 133,403

[22] Filed: Mar. 24, 1980

Related U.S. Application Data

[63] Continuation-in-part of Ser. No. 13,511, Feb. 23, 1979, Pat. No. 4,278,071.

[30] Foreign Application Priority Data

Feb. 24, 1978 [GB] United Kingdom ............... 7426/78
May 24, 1979 [GB] United Kingdom ............. 18202/79

[51] Int. Cl.³ .............................................. F24J 3/02
[52] U.S. Cl. .................... 126/429; 126/428; 126/DIG. 2; 126/444; 98/42 R
[58] Field of Search ............... 126/431, 428, 429, 417, 126/449, DIG. 2, 444, 445; 52/199, 95, 303, 302, 22; 98/42 R, 42 A; 165/53, 54, 57

[56] References Cited

U.S. PATENT DOCUMENTS

| | | | |
|---|---|---|---|
| 2,529,621 | 11/1950 | Mayo | 126/428 X |
| 4,020,989 | 5/1977 | Kautz | 126/431 X |
| 4,066,118 | 1/1978 | Goettl | 126/435 X |
| 4,201,121 | 5/1980 | Brandenburg, Jr. | 98/42 R X |
| 4,244,353 | 1/1981 | Straza | 126/DIG. 2 X |

Primary Examiner—Larry Jones
Attorney, Agent, or Firm—Posnack, Roberts, Cohen & Spiecens

[57] ABSTRACT

A roofing panel of glass-reinforced plastic (G.R.P.) or sheet metal is stiffened by longitudinal beams on its underside to span one pitch of a pitched roof from eaves to ridge. It has an outer skin and an inner impervious liner spaced therefrom and supported on the stiffening beams so as to form a tunnel open at both ends and extending from the vicinity of the eaves to the line of the roof ridge, where vents to atmosphere are provided in the outer skin. Air is convected upwards through the tunnel due to the heating of the outer skin by radiation from the sun. At the eaves end the tunnel also has an inlet port communicating with the roof space, and a damper controls the air flowing in from outside the building and the air flowing in from the roof space. At the line of the ridge the liner meets and is sealed on the corresponding liner of a counterpart panel on the opposite pitch of the roof so as to maintain the integrity of the convection air circuit in each section of the roof. A heat exchanger located in the tunnel transfers heat from the convected air to a hot water system in the building. A hollow box girder spans the width of the panel across the beams so as to rest on the top of a flank wall of the building and can be filled with concrete to anchor the panel in position.

28 Claims, 19 Drawing Figures

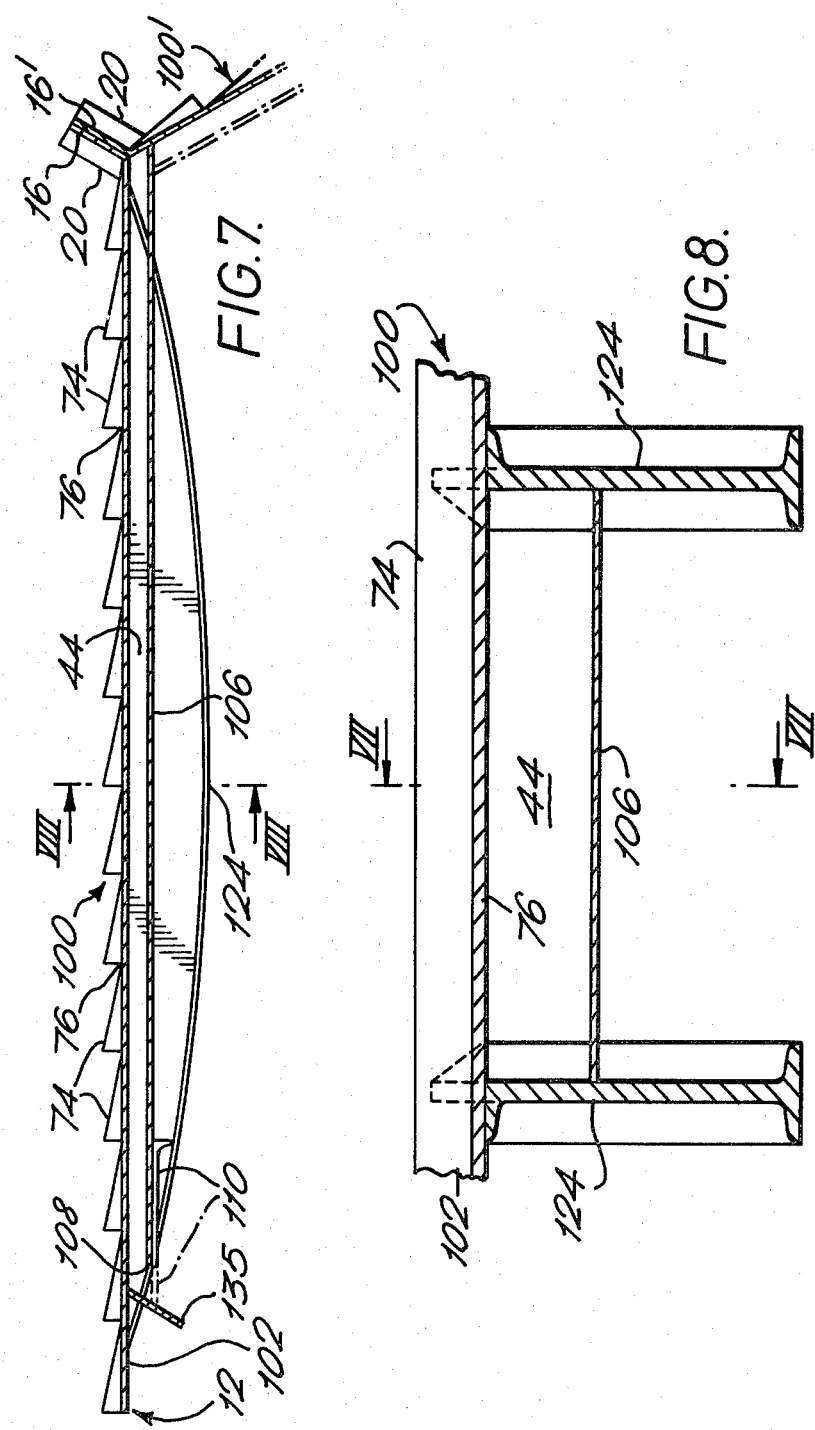

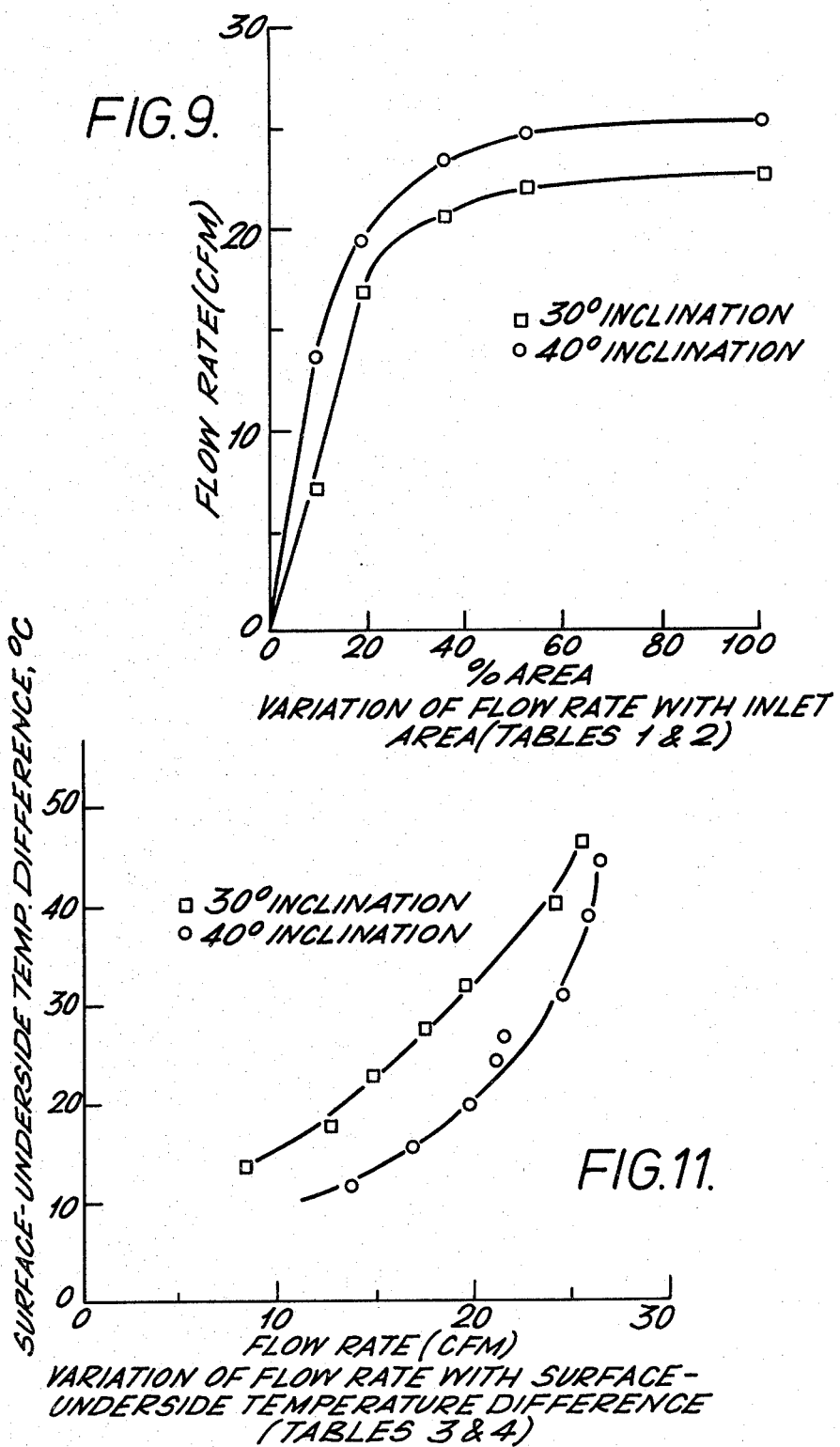

VARIATION OF FLOW RATE WITH SURFACE TEMPERATURE AND UNDERSIDE TEMPERATURE (TABLES 3 & 4)

VARIATION OF SURFACE TEMPERATURE, UNDERSIDE TEMPERATURE AND FLOW RATE WITH AMBIENT TEMPERATURE (TABLES 5 & 6)

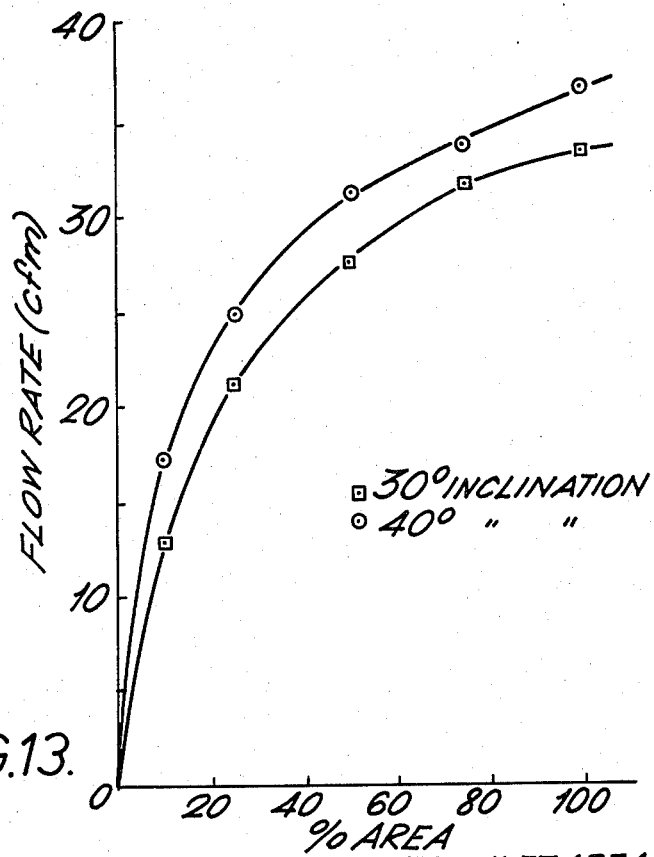
FIG.13. VARIATION OF FLOW RATE WITH INLET AREA (TABLES 7&8)
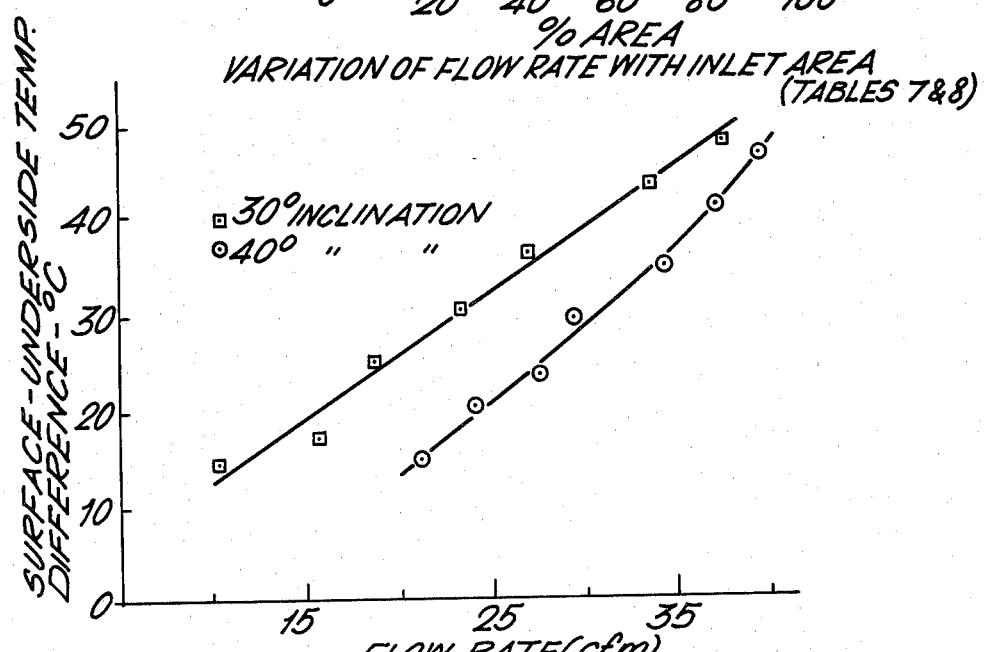
FIG.15. VARIATION OF FLOW RATE WITH SURFACE-UNDERSIDE TEMPERATURE DIFFERENCE (TABLES 9&10)

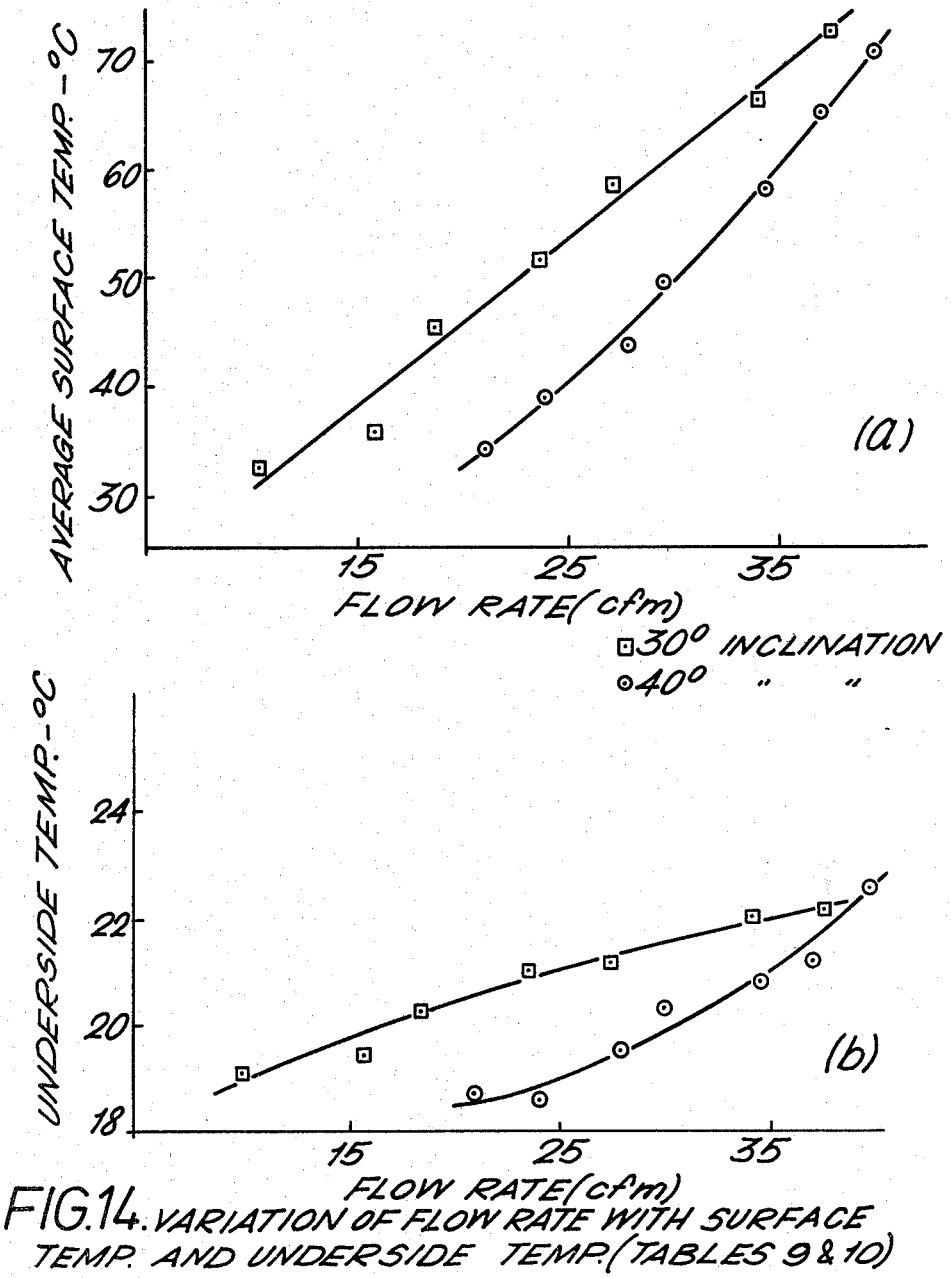
FIG.14. VARIATION OF FLOW RATE WITH SURFACE TEMP. AND UNDERSIDE TEMP. (TABLES 9 & 10)

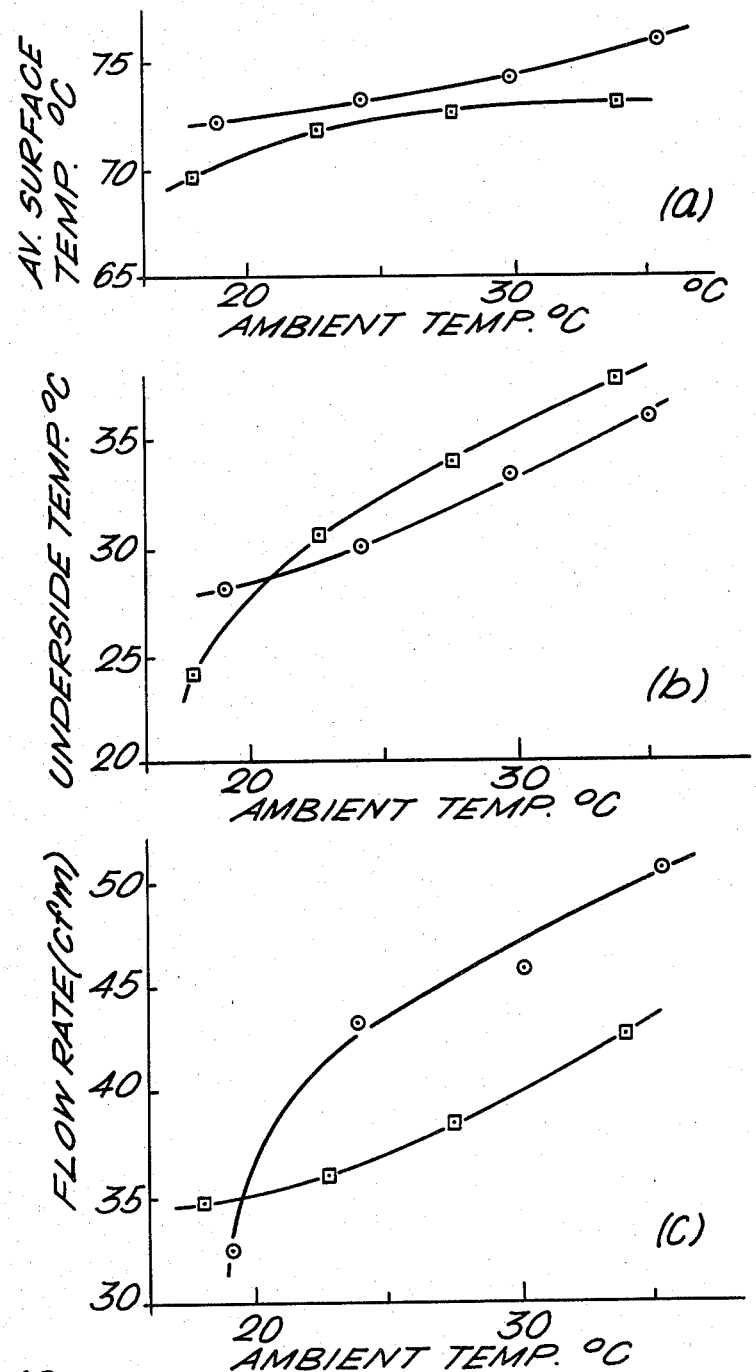
FIG.16. VARIATION OF SURFACE & UNDERSIDE TEMP. AND FLOW RATE (TABLES 11 & 12)

ROOFING PANELS

This application is a continuation-in-part of my earlier application U.S. Ser. No. 13,511 filed Feb. 23, 1979, now U.S. Pat. No. 4,278,071.

FIELD OF INVENTION

The invention relates to roofing panels, and more particularly to roofing panels which are designed to act as collectors of solar radiation, usually for the purpose of converting said radiation into another form of energy such as hot water. They may be made of glass-reinforced plastics (GRP) or sheet metal.

In British Pat. No. 1,521,637, and in the corresponding pending application U.S. Ser. No. 919,956, filed June 28, 1978, now U.S. Pat. No. 4,284,065, there are described various designs of roof panel, primarily intended for manufacture in GRP, and of a length to extend from the eaves to the ridge of the roof, although in roofs of large span, panels can be butted end-to-end. One feature of these designs is an integral longitudinal stiffening beam extending substantially from eaves to roof. Usually there are two or more such beams, each normally of the same material as the panel, one or more plies of the panel being preferably "laid up" over a beam former when it is in position on the partly finished panel.

Another feature of the panel disclosed in the said British patent and corresponding U.S. application is the formation, within the main body of the panel, of a plurality of fluid circulation ducts whereby oil or water passing through them collects heat from the sun's radiation falling on the external surface of the panel and so enables the radiant energy to be converted into a more readily usable form within the building—for example, hot water. One advantage of such a panel is that, in hot weather, less heat is transmitted to the interior of the building than if the panel were a simple single skin structure. But however effective the fluid circulation ducts may be in absorbing radiant heat from the sun, and thus reducing the amount of heat transmitted to the interior of the building, they can only cover a limited area of each roof panel, leaving the remaining areas as relatively high heat transmitters.

Numerous proposals have been made to superimpose on the external surfaces of roofs and walls separate fluid circulation panels for the absorption of radiant energy from the sun and its conversion into heat in water or other fluid circulated through the superimposed panels. Such panels can, if required, be dimensioned so as to cover an entire roof area and act as roof insulators, so that a higher degree of protection from heat transmission through the roof can be afforded.

One drawback of the superimposed panels is that the flow and return header connections normally have to penetrate the roof skin, leading to considerable weather seal problems. Furthermore, their weight is added to the load imposed on the roof supporting structure by the existing roof material. But what none of the aforesaid prior proposals is able to provide is a ventilation system for the interior of the building, drawing air by natural thermal circulation upwards over the underside of the roof panels and discharging it to atmosphere at the ridge. It is an object of the present invention to provide a construction of roof panel whereby this can be achieved if desired, while at the same time imposing an almost negligible increase in the deadweight of the roof skin. In fact, it is one of the main advantages of a construction according to the present invention that the roof panels are largely, or even wholly, self-supporting both during and after erection on the building, thus permitting an actual reduction in the quantity of wood or other material normally required for supporting conventional tile or slate roofs.

If the temperature of the underside of a roof panel is high enough to establish and maintain a rising current of air thereover, a system designed to take practical advantage of this physical phenomenon can be designed also to extract heat from the air current prior to its discharge to atmosphere and produce a usable product such as hot water.

It is important in practice to be able to select, in any given circumstances, whether or not to take advantage of a ventilating facility. On the other hand, whenever meteorological conditions are favourable, it is more than likely that a heat exchange facility will be a considerable advantage. Consequently, it is an aim of the present invention to provide a roofing panel which is capable of combining a ventilating system with a heat exchanger.

Another object is to provide for selective controllability of the ventilating air flow.

SUMMARY OF INVENTION

According to the present invention a roofing panel comprises an outer skin of a structural sheet material such as sheet metal or glass-reinforced plastics adapted to be secured at the ridge end to a counterpart panel on the opposite pitch of the roof so as to provide one or more ventilation gaps between the panels; an integral longitudinal stiffening beam extending along the underside of the panel substantially from eaves to ridge; and a generally flat inner liner of impervious sheet material sealed along its longitudinal edges to the outer skin and spaced therefrom by the beam to form a tunnel extendign from eaves to ridge, the ridge end of the liner being adapted to be sealed to the corresponding end of the inner liner of the counterpart panel.

Preferably, each panel terminates at its ridge end in an upstanding flange which is corrugated to present a wavy or castellated contour in plan such that each rib of a corrugation can register with and be secured to the corresponding rib on the counterpart panel.

Alternatively, each upstanding flange is straight and offset slightly back from the vertical plane in which the ridge ends of the liners meet so that spacers can be inserted between the flanges at intervals along the line of the ridge to define ventilation gaps.

Advantageously, a hollow box girder is fixed transversely to the underside of the stiffening beam at the eaves end of the panel to register with and rest upon the top of a side wall of the building when the panel forms part of the roof structure in situ, and the eaves end of the liner meets and is sealed to the girder.

Conveniently, each panel has two laterally spaced stiffening beams and the liner spans the gap between them.

A practical embodiment of the present invention will now be described, by way of example only, with reference to the accompanying drawings.

BRIEF DESCRIPTION OF DRAWINGS

FIG. 7 is a schematic longitudinal section of a metal panel taken on the line VII—VII of FIG. 8;

FIG. 8 is an enlarged fragmentary section on the line VIII—VIII of FIG. 7;

FIGS. 9-12 are graphs of the results of tests on a GRP panel;

FIGS. 13-16 are graphs of the results of similar tests on a metal panel;

DETAILED DESCRIPTION

Figure 1:
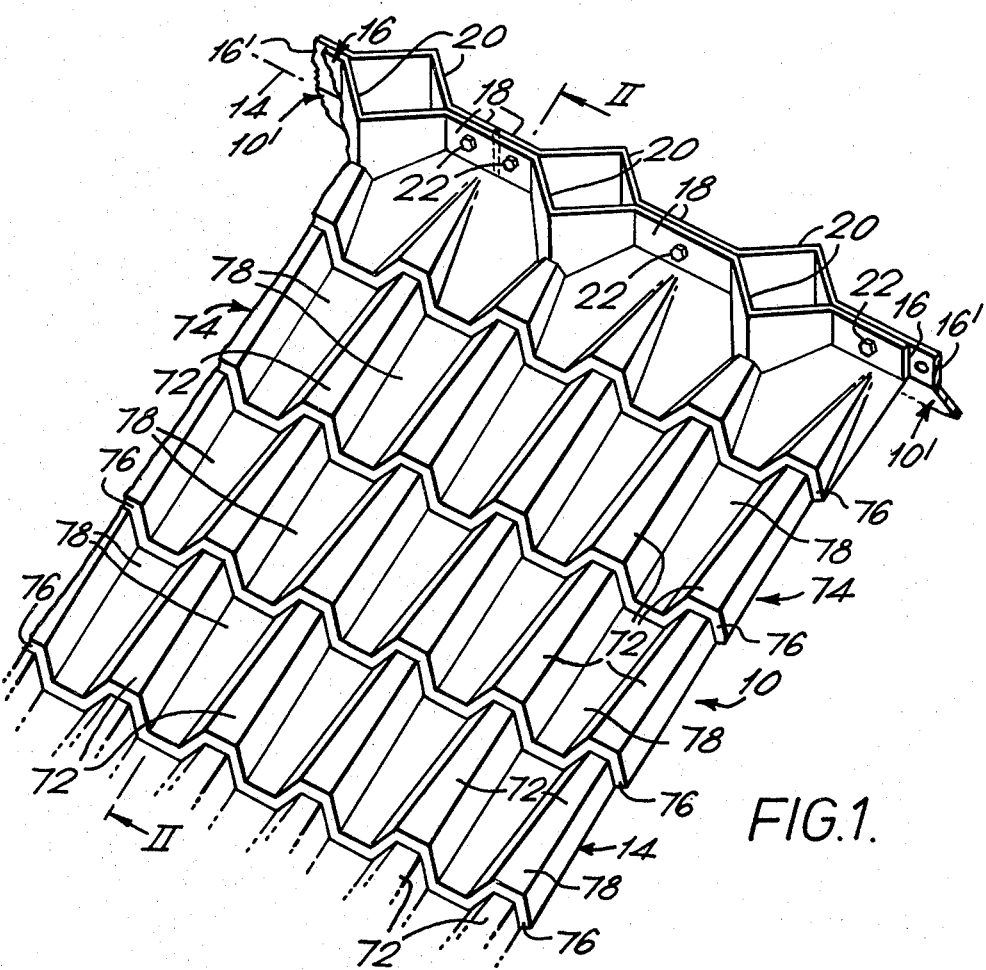
FIG. 1 is a fragmentary perspective view of a panel showing abutting ridge flanges.

Referring first to FIGS. 1-4, the outer skin of a roofing panel 10 is formed in, say, glass-reinforced plastics (GRP) so that its outer or upper surface resembles Roman tiles. The panel extends from the eaves at 12 to the ridge line 14 of a pitched roof on a building such as a house. At the ridge line 14, the panel 10 terminates in an upstanding corrugated ridge flange 16 which presents a castellated profile in plan, each rib 18 alternating with a triangulated valley 20 registering with a counterpart rib 18 on the flange 16' of an oppositely pitched panel 10'. Where two valleys 20 register, a vent is formed which opens the space beneath the outer skin of the panel 10 to atmosphere. Bolts 22 or like fixings passed through the mating ribs 18 secure the panels 10, 10' at the roof ridge.

Figure 3:
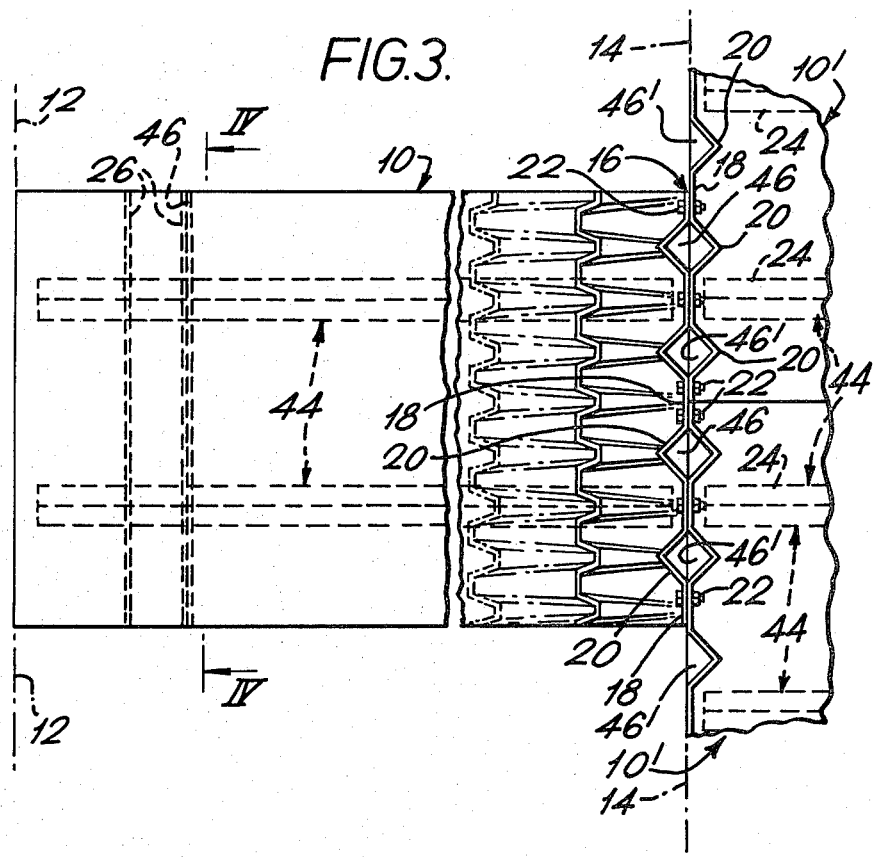
FIG. 3 is a fragmentary plan view of FIG. 1.
Figure 4:
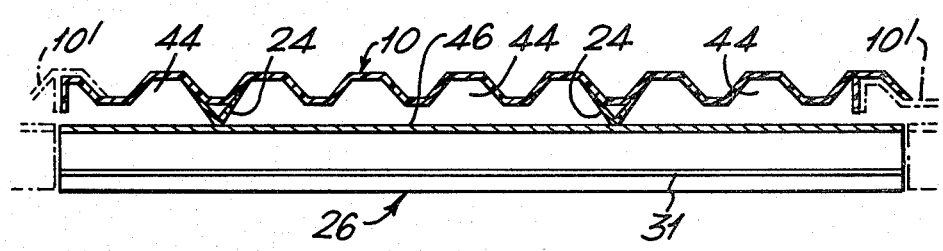
FIG. 4 is a section on the line IV—IV of FIG. 3.

On the underside of the outer skin of each panel 10, 10' are integral stiffening beams 24 whose positions transversely of a panel are such that whether the panels 10, 10' are exactly aligned or whether they are staggered by a half width (as shown in FIG. 3), two beams 24 on opposite sides of the ridge line 14 always lie in the same vertical plane. The crests of the beams 24 are preferably convex downwards, the height of the beam from root to crest increasing progressively from zero at the eaves line 12 and the ridge line 14 to a maximum at about mid-span. Each panel 10 has two beams 24 to the underside of which, adjacent the eaves line 12, is secured a transverse hollow box girder 26 having continuous top and bottom walls 28, 30 and continuous outer and inner flank walls 32, 34 respectively. The flank walls 32, 34 are extended downwards at 33, 35 to embrace the top course or wall plate of an external side wall 36 of the building of whose roof the panel 10 will form a part. The bottom wall 30 of the box girder 26 is extended inwards at 31 to provide a fixing flange for a ceiling structure (not shown). The box girder 26 is secured transversely to each stiffening beam 24 by means of depending outer and inner brackets 38, 40 which engage the outer and inner flank walls 32, 34 of the girder. The girder lies parallel to the eaves line 12 between the vertical planes containing the opposite edges of the panel 10. Provision can be made for inter-fitting the meeting ends of adjacent box girders 26 in a substantially fluid-tight manner, but normally an adequate seal is obtained when the meeting edges are designed to abut. Concrete can be pumped into each box girder 26 through an aperture 27 (FIG. 5), and if it is pumped into the box girders of all the panels in the assembled roof it can provide the necessary anchorage for the roof. The extensions 33, 35 embrace the wall plate or top course of an external flank wall of the building and can be bolted through to provide either an initial location prior to injection of the concrete or a permanent fixing if it is preferred not to fill the box girders 26 with concrete.

The beams 24 are designed to project beyond the outer flank wall 32 of the box girder 26 so that a transverse slot 42 (FIG. 2) is formed between the stiffening beams 24 and bounded by the panel 10 and the top wall 28 of the box girder 26. This slot 42 becomes, according to the present invention, the entrance to a tunnel or duct 44 formed by the bridging of the crests of pairs of adjacent stiffening beams 24 by means of a generally flat, impervious membrane or inner liner 46. This liner can be of any convenient material, whether rigid, semi-stiff, or flexible. In certain applications the compressed fibrous material known generally as "hardboard" is eminently suitable. Other possible materials include sheet metal and plastic sheeting. The eaves end of the liner 46 is sealed for its full width to the inner flank wall 34 of the box girder 26 so as to make an air-tight joint. At the ridge end the liner 46 meets and is sealed to its counterpart or counterparts 46' to form an upwardly convex Vee joint. This joint can be reinforced by a sealing strip or plate 48.

Since each stiffening beam 24 tapers to zero height at the ridge end the liners 46, 46' can either be packed out by means of a spacer web 50 formed integrally with the beam 24 at the ridge end, or left separated from the crest of the beam over the required length so as to ensure that the tunnels or ducts 44 are not closed off at their ridge ends. Since each liner 46 or 46' is of the same width as the panel 10, it only needs mechanical support from each beam 24 without the necessity for an air-tight seal between liner and beam. This support can be provided by screws or similar fixings at intervals along the length of each beam, and the crest of each beam may be suitably thickened or reinforced to receive such fixings. The longitudinal edges of the liners 46, on the other hand, must be sealed to the corresponding edges of the adjacent liners so that a double-skin roof structure is achieved with no communication between the inter-skin tunnels or ducts 44 and the under-roof space unless deliberately provided. Air can thus flow into the tunnels or ducts 44 through the vents at 20 in the roof ridge.

Whether the vents 20 are formed by the castellation of the ridge flanges 16 or by means of spacers inserted between straight ridge flanges, they may be protected against the undesirable entry of foreign matter, especially rain, by means of an "umbrella" capping 52 (FIG. 2) supported on legs or flanges 54 which are clamped in place by the bolts 22 to hold the capping 52 clear of the vents 20.

Figure 5:
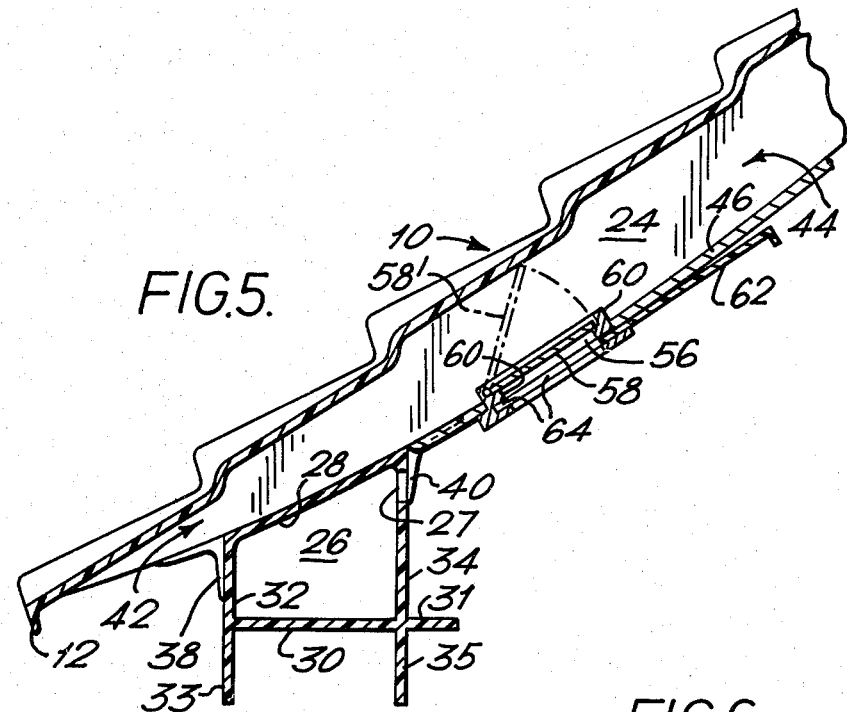
FIGS. 5 and 6 are fragmentary longitudinal sections and underplan views, respectively, of a modification, FIG. 5 being a section on the line V—V of FIG. 6.
Figure 6:
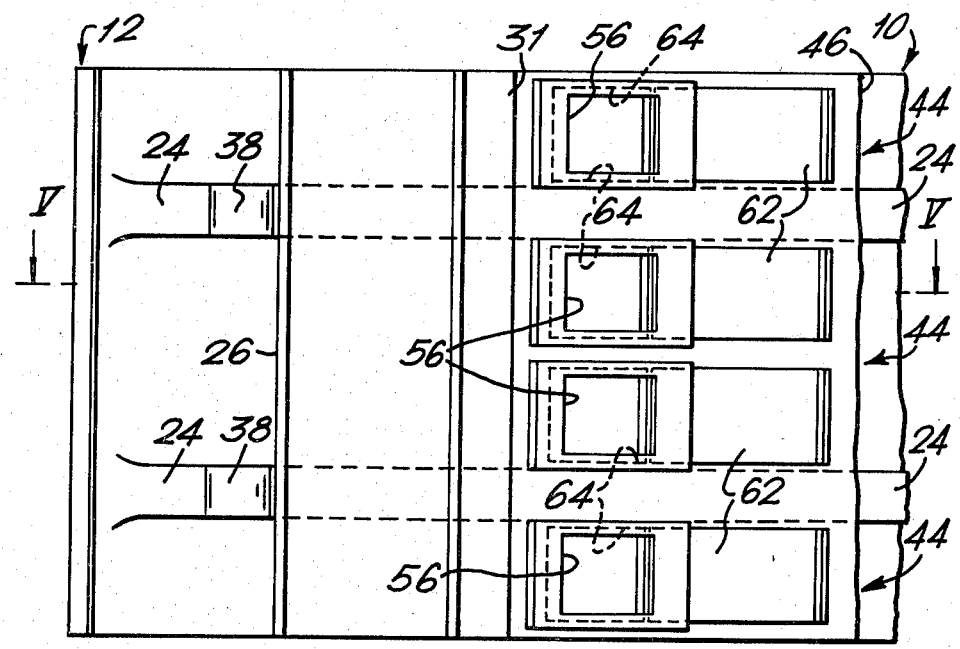

When the outer skin of each panel 10 is heated by the sun, the air within the tunnels or ducts 44 becomes heated and a natural convection flow of air is established from the eaves inlets 42 to the ridge vents 20 which carries much of the incident heat away to atmosphere and maintains the liner 46 relatively cool. Tests have shown that this natural convection can easily reach a volume flow rate of significant magnitude such that the interior of the building covered by the roof can be effectively ventilated. In order to take advantage of this effect, the invention includes the provision of "internal" inlet ports in the liners 46 at points adjacent to, and inboard of, the box girder 26 in conjunction with dampers or flap valves for closing the eaves inlets 42. Such a modification is illustrated in FIGS. 5 and 6, which show ventilation inlet ports 56 in each liner adjacent to, and inboard of, the box girder 26. Each port is controlled by a hinged flap or damper 58 which cooperates with a seating 60 surrounding the port 56 so that the tunnel 44 can be sealed from the interior of the building if desired. When the flap 58 is fully raised, as shown at 58' in FIG. 5, entry of the air through the eaves slots 42 is cut off, or at least throttled to a minimum, and full interior ventilation is provided. At any intermediate position of the flap 58, the air passing up the tunnel 44 is a mixture of interior ventilation air and air from the exterior of the building.

In the event that interior ventilation alone is required, the slots 42 at the eaves can, if necessary, be permanently sealed, and each port 56 can be controlled by a sliding plate 62 (FIG. 6) working in channels 64 in conventional manner. However, permanent sealing of the slots 42 would not normally be adopted so as to enable any water or dust which is driven by the wind down through the roof ridge vents 20 to be discharged outside the building.

Where sufficiently high rates of thermal radiation fall on the outer skin of a panel 10 the temperature of the air convected up each tunnel 44 rises, at or near the vents 20, to a value such that useful heat exchange can be effected. Accordingly, a heat exchanger, shown diagrammatically at 68 (FIG. 2), may be located near the top of each tunnel 44 in the form of gilled tubes through which is circulated a heat exchange fluid. Thus, for example, a loop consisting of a flow and return gilled pipe connected in series may be mounted transversely of the tunnel, each loop being connected across a pair of flow and return headers 70 located below and parallel to the line 14 of the roof ridge. Preliminary tests on a prototype convenction panel according to the present invention seem to indicate that there is usually a "hot spot" about one fifth of the length of the tunnel 44 back from the roof ridge, and hence this might be the optimum location for the heat exchange loop.

In the drawings, the outer skin of a panel is shown as having longitudinal corrugations 72 (FIG. 1) divided transversely into rows 74 by steps 76 to simulate overlapping courses of tiles. The corrugations are separated by flat valleys 78, and taper in both width and height. It is to be understood the outer skin of a panel according to the present invention may have any other surface configuration, including flat.

The tests referred to above are made on a GRP panel 10 as shown in FIGS. 5 and 6 having two symmetrically spaced stiffening beams 24 and a single tunnel or ventilating duct 44 between them. Other structural details are as follows:

| | |
|---|---|
| material of outer skin | GRP |
| average thickness of outer skin | ⅛ in. |
| material of liner 46: | hardboard |
| average width of tunnel 44 | (approx) 20 in. |
| length of tunnel 44 - inlet 56 to vent 20: | 10 feet |
| max. area of inlet port 56: | 77.5 in² |

The tests are recorded in Tables 1–6, and graphs of the results are shown in FIGS. 9–12 of the drawings.

TABLE 1

Convection Panel Inclination = 30°
Constant Heat Input
Ambient Temperature = 18° C.
Inlet Port Opening Variable
(FIG. 9)

| | Run No. | | | | |
|---|---|---|---|---|---|
| Quantity | 1 | 2 | 3 | 4 | 5 |
| Average surface temperature $T_s$, °C. | 58 | 57.3 | 61.6 | 60.4 | 61.7 |
| Average underside temperature $T_w$, °C. | 26 | 24 | 24.1 | 23 | 23.4 |
| $T_s - T_w$, °C. | 32 | 33.3 | 37.5 | 37.4 | 38.3 |
| % of fully open port area | 9 | 17.4 | 35 | 52 | 100 |
| Air volume flow rate at inlet cfm. | 7.11 | 16.8 | 20.7 | 22 | 22.6 |

TABLE 2

Convection Panel Inclination = 40°
Constant Heat Input
Ambient Temperature = 18° C.
Inlet Port Opening Variable
(FIG. 9)

| | Run No. | | | | |
|---|---|---|---|---|---|
| Quantity | 1 | 2 | 3 | 4 | 5 |
| Average surface temperature $T_s$, °C. | 60.4 | 58.8 | 59.9 | 60.2 | 60 |
| Average underside temperature $T_w$, °C. | 26.2 | 25.3 | 24.9 | 24.7 | 24.5 |
| $T_s - T_w$, °C. | 34.2 | 33.5 | 35 | 35.5 | 35.5 |
| % of fully open port area | 9 | 17.4 | 35 | 52 | 100 |
| Air volume flow rate at inlet cfm. | 13.6 | 19.4 | 23.5 | 24.8 | 25.2 |

TABLE 3

Figure 10:
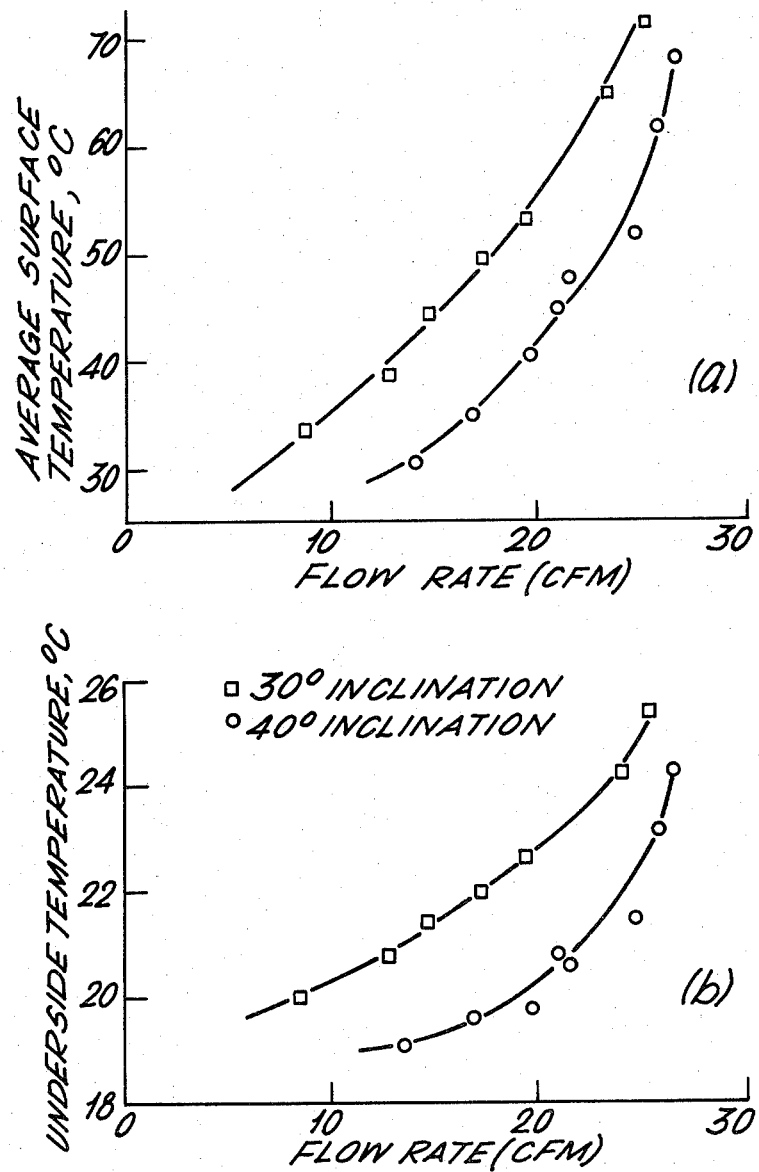

Convection Panel Inclination = 30°
Heat Input Variable
Ambient Temperature = 18° C.
Inlet Port Area Fully Open
(FIGS. 10 & 11)

| | Run No. | | | | | | |
|---|---|---|---|---|---|---|---|
| Quantity | 1 | 2 | 3 | 4 | 5 | 6 | 7 |
| Average surface temperature $T_s$, °C. | 71.4 | 64.2 | 53.3 | 49.4 | 44.2 | 38.2 | 33.5 |
| Average underside temperature $T_w$, °C. | 25.3 | 24.2 | 22.6 | 22 | 21.4 | 20.7 | 20 |
| $T_s - T_w$, °C. | 46.1 | 40 | 30.7 | 27.4 | 22.8 | 17.5 | 13.5 |
| Air volume flow rate at inlet cfm | 25.3 | 24 | 19.4 | 17.4 | 14.7 | 12.7 | 8.68 |

TABLE 4

Convection Panel Inclination = 40°
Heat Input Variable
Ambient Temperature = 17.5° C.
Inlet Port Area Fully Open
(FIGS. 10 & 11)

| Quantity | Run No. | | | | | | | |
|---|---|---|---|---|---|---|---|---|
| | 1 | 2 | 3 | 4 | 5 | 6 | 7 | 8 |
| Average surface temperature $T_S$, °C. | 68.1 | 61.6 | 51.8 | 47.3 | 44.9 | 40.1 | 34.9 | 30.6 |
| Average underside temperature $T_w$, °C. | 24.2 | 23.1 | 21.4 | 20.6 | 20.8 | 20.4 | 19.6 | 19.1 |
| $T_S - T_w$, °C. | 43.9 | 38.5 | 30.4 | 26.7 | 24.1 | 19.7 | 15.3 | 11.5 |
| Air volume flow rate at inlet cfm | 26.4 | 25.7 | 24.7 | 21.4 | 21 | 19.7 | 16.7 | 13.7 |

TABLE 5

Figure 12:
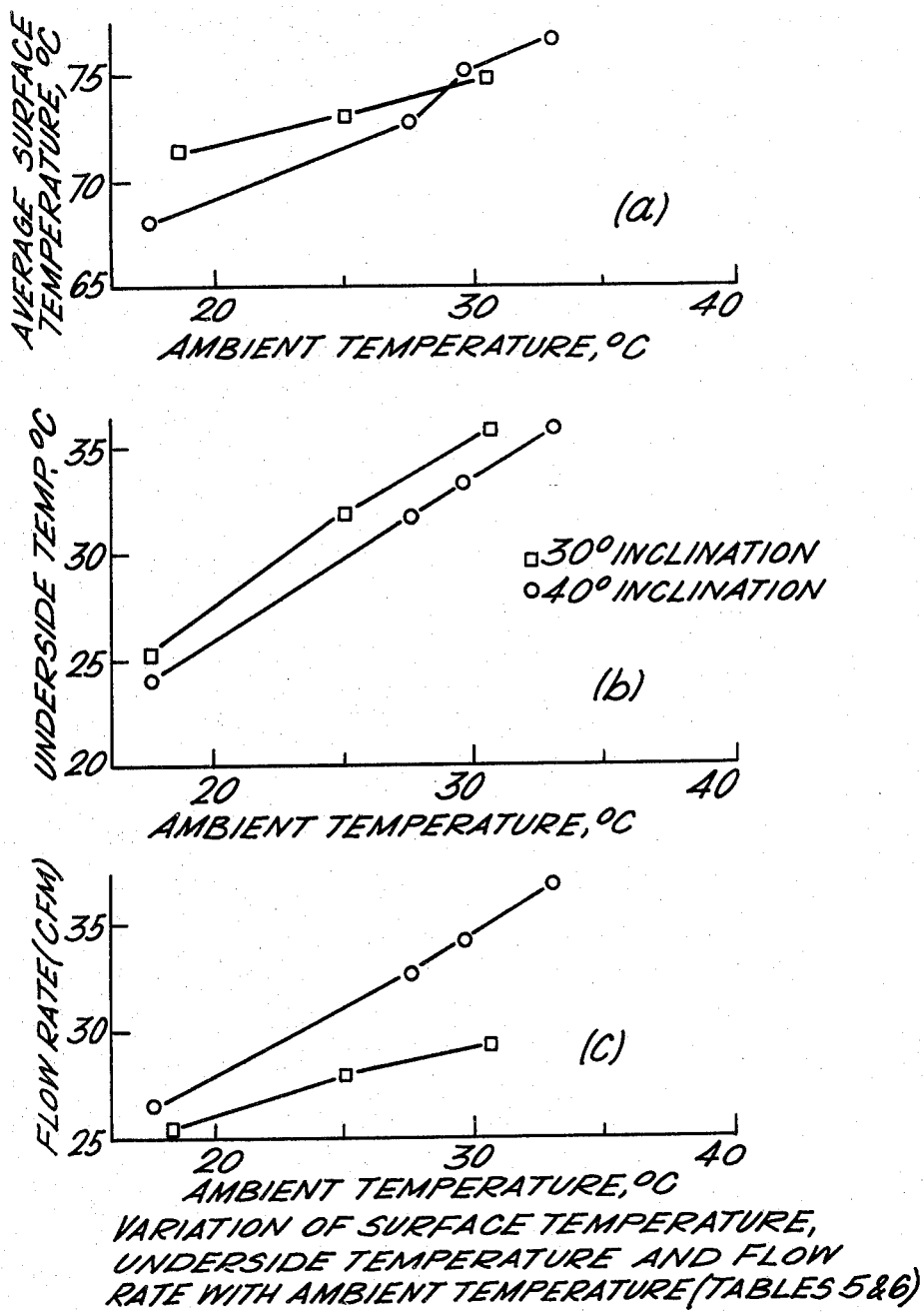

Convection Panel Inclination = 30°
Constant Heat Input
Ambient Temperature Variable
Inlet Port Area Fully Open
(FIG. 12)

| Quantity | Run No. | | |
|---|---|---|---|
| | 1 | 2 | 3 |
| Average surface temperature $T_S$, °C. | 71.4 | 73 | 74.7 |
| Average underside temperature $T_w$, °C. | 25.3 | 31.8 | 35.8 |
| $T_S - T_w$, °C. | 46.1 | 41.2 | 38.9 |
| Ambient temperature °C. | 18.5 | 25 | 30.5 |
| Air volume flow rate at inlet cfm | 25.3 | 28 | 29.3 |

TABLE 6

Convection Panel Inclination = 40°
Constant Heat Input
Ambient Temperature Variable
Inlet Port Area Fully Open
(FIG. 12)

| Quantity | Run No. | | | |
|---|---|---|---|---|
| | 1 | 2 | 3 | 4 |
| Average surface temperature $T_S$, °C. | 68.1 | 72.6 | 75.1 | 76.7 |
| Average underside temperature $T_w$, °C. | 24.2 | 31.6 | 33.2 | 35.7 |
| $T_S - T_w$, °C. | 43.9 | 41 | 41.9 | 41 |
| Ambient temperature °C. | 17.5 | 27.5 | 29.5 | 33 |
| Air volume flow rate at inlet cfm | 26.4 | 32.6 | 34.4 | 36.5 |

The foregoing results lead to certain conclusions:
1. The temperature $T_w$ on the underside of the composite GRP panel is much lower than the surface temperature—usually less than half—especially at the higher surface temperatures.
2. The volume rate of flow of air up the tunnel 44 increases, often by more than 10%, with increasing inclination of the panel from 30° to 40° (see FIGS. 9–11).
3. The volume rate of flow of air increases significantly with increasing ambient temperature (see FIG. 12C).

From the curves of FIG. 10 it appears that the volume rate of flow of air circulating through the tunnel 44 tends to maximum irrespective of any increase in temperature of the outer skin. FIG. 11 shows the volumetric flow rates obtained with any given value of temperature difference across the tunnel 44 for two different inclinations of the panel 10, and demonstrates the increase in temperature difference which is required to establish a given volumetric flow rate as the angle of inclination of the panel 10 is reduced from 40° to 30°.

Referring now to FIGS. 7 and 8, a metal panel 100 has an outer skin 102 of, say, an aluminium alloy to similar external contour and dimensions as those of the panels 10 of FIGS. 1–6. Each panel 100 is stiffened by two metal longitudinal beams 124 of nominally I-section extending from a point near the eaves line 12 to a point close to the ridge flange 16.

The beams 124 are described as "nominally I-section" because the edge of each beam which abuts the underside of the outer skin 102 is required to follow the sawtooth shape of its longitudinal cross-section. The flange of the beam along this edge is, therefore, stepped in a succession of triangles, each step fitting snugly under a step 76.

A flat wall-fixing skirt 135 is shown in place of the box girder 26 of FIGS. 1–6, but this is optional, and a hollow box girder 26 may be substituted. Between the stiffening beams 124 is mounted a liner or baffle 106 which terminates at its lower or eaves end 108 sufficiently short of the skirt 135 to define an air inlet port to the tunnel 44 from the roof space. A sliding damper 110 controls the area of the port opening into the tunnel 44.

Figure 2:
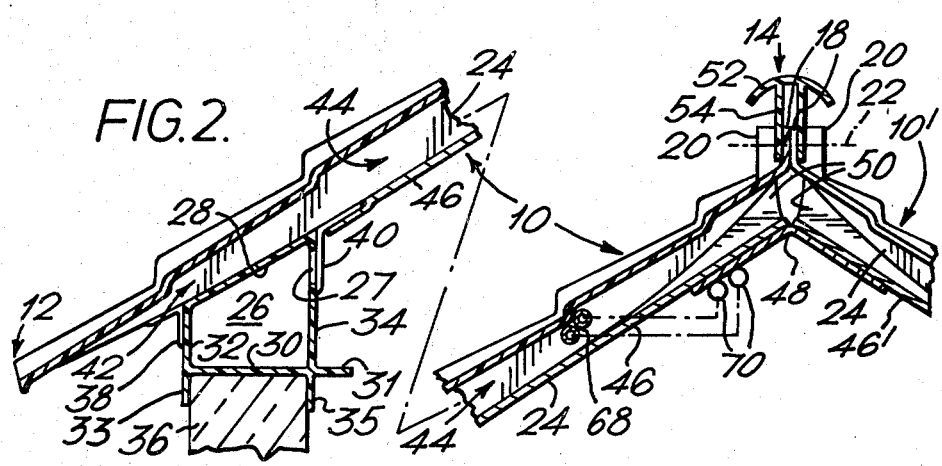
FIG. 2 is a fragmentary transverse sectional elevation on the line II—II of FIG. 1.

At the ridge end of the tunnel 44 the liner 106 either terminates in a straight edge designed to abut the corresponding edge of a counterpart liner on a roof panel fixed on the opposite roof pitch, as shown in FIG. 2; or, as shown in FIG. 7, it is extended beyond the mean plane of abutment of the ridge flanges 16, 16' to meet the underside of a roof panel 100' on the opposite pitch of the roof.

A test panel similar to the GRP panel referred to above was made and tested under the same conditions as before. Structural details are as follows:

| | |
|---|---|
| material of outer skin | 12G Al. alloy |
| material of baffle 106 | hardboard |
| av. width of tunnel 44 | (approx) 18" |
| min. height of tunnel | 2" |
| length of tunnel - inlet 108 to ridge | 15'5" |
| area of tunnel at 108 | 72 in² |

The results of the tests on the metal panel 100 are recorded in Tables 7–12 and illustrated in FIGS. 13–16. They show significant increases in the values of items 1 and 3 of the analysis of results for the composite GRP panel. Thus:

(1a) the value of $T_w$ is between 2° C. and 5.6° C. lower, depending on the inlet port opening and inclination of the panel.

(2a) the percentage increase in volume rate of flow of air (ventilating capacity) with increase in panel inclination is about the same as for the GRP test panel.

(3a) the actual increase in ventilating capacity is markedly higher for the composite metal panel; at 30° panel inclination, the increase in volume rate of flow is between 37% and 43%; at 40° it is between 20% and 35%.

TABLE 7

Metal Convection Panel Inclination = 30°
Constant Heat Input
Ambient Temperature = 18° C.
Inlet Port Opening Variable
(FIG. 13)

| Quantity | Run No. | | | | |
|---|---|---|---|---|---|
| | 1 | 2 | 3 | 4 | 5 |
| Average surface temperature $T_s$, °C. | 58 | 58.5 | 62 | 61 | 61.7 |
| Average underside temperature $T_w$, °C. | 24 | 22.8 | 21.3 | 20.1 | 19.6 |
| $T_s - T_w$, °C. | 34 | 35.7 | 40.7 | 40.9 | 42.1 |
| % of fully open port area | 10 | 25 | 50 | 75 | 100 |
| Air volume flow rate at inlet cfm. | 12.5 | 21.5 | 27.5 | 30.4 | 31.6 |

TABLE 8

Metal Convection Panel Inclination = 40°
Constant Heat Input
Ambient Temperature = 18° C.
Inlet Port Opening Variable
(FIG. 13)

| Quantity | Run No. | | | | |
|---|---|---|---|---|---|
| | 1 | 2 | 3 | 4 | 5 |
| Average surface temperature $T_s$, °C. | 60 | 60.2 | 58.9 | 59.6 | 60.3 |
| Average underside temperature $T_w$, °C. | 22.6 | 21.7 | 20.2 | 19.8 | 19.2 |
| $T_s - T_w$, °C. | 37.4 | 38.5 | 38.7 | 39.8 | 41.1 |
| % of fully open port area | 10 | 25 | 50 | 75 | 100 |
| Air volume flow rate at inlet cfm. | 17 | 24.9 | 31.2 | 33.9 | 36.0 |

TABLE 9

Metal Convection Panel Inclination = 30°
Heat Input Variable
Ambient Temperature = 18° C.
Inlet Port - Fully Open
(FIGS. 14 & 15)

| Quantity | Run No. | | | | | | |
|---|---|---|---|---|---|---|---|
| | 1 | 2 | 3 | 4 | 5 | 6 | 7 |
| Average surface temperature $T_s$, °C. | 72 | 66 | 58 | 51 | 45 | 36 | 32.8 |
| Average underside temperature $T_w$, °C. | 22.2 | 21.9 | 21.3 | 20.9 | 20.4 | 19.2 | 18.7 |
| $T_s - T_w$, °C. | 49.8 | 44.1 | 36.7 | 30.1 | 24.6 | 16.8 | 14.1 |
| Air volume flow rate at inlet cfm | 36.3 | 33.6 | 26.6 | 23.2 | 18.8 | 15.8 | 10.6 |

TABLE 10

Metal Convection Panel Inclination = 40°
Heat Input Variable
Ambient Temperature = 17.5° C.
Inlet Port - Fully Open
(FIGS. 14 & 15)

| Quantity | Run No. | | | | | | |
|---|---|---|---|---|---|---|---|
| | 1 | 2 | 3 | 4 | 5 | 6 | 7 |
| Average surface temperature $T_s$, °C. | 70.2 | 64.1 | 57 | 49.8 | 44 | 38.2 | 33.5 |
| Average underside temperature $T_w$, °C. | 23.1 | 21.4 | 21 | 20.3 | 19.5 | 18.1 | 18.3 |
| $T_s - T_w$, °C. | 47.1 | 42.7 | 36 | 29.5 | 24.5 | 20.1 | 15.2 |
| Air volume flow rate at inlet cfm | 38 | 35.9 | 33.8 | 28.5 | 26.9 | 23.6 | 20.4 |

TABLE 11

Metal Convection Panel Inclination = 30°
Constant Heat Input
Ambient Temperature Variable
Inlet Port - Fully Open
(FIG. 16)

| Quantity | Run No. | | | |
|---|---|---|---|---|
| | 1 | 2 | 3 | 4 |
| Average surface temperature $T_s$, °C. | 69.8 | 71.4 | 71.6 | 72 |
| Average underside temperature $T_w$, °C. | 24.7 | 31.1 | 34.3 | 37.1 |
| $T_s - T_w$ °C. | 45.1 | 40.3 | 37.3 | 34.9 |
| Ambient temperature °C. | 18 | 23 | 27.5 | 33 |
| Air volume flow rate at inlet cfm | 34.4 | 35.3 | 38.4 | 41.9 |

TABLE 12

Metal Convection Panel Inclination = 40°
Constant Heat Input
Ambient Temperature Variable
Inlet Port - Fully Open
(FIG. 16)

| Quantity | Run No. | | | |
|---|---|---|---|---|
| | 1 | 2 | 3 | 4 |
| Average surface temperature $T_s$, °C. | 72.1 | 72.9 | 74.1 | 75.3 |
| Average underside temperature $T_w$, °C. | 28.1 | 30.5 | 33.5 | 36.3 |
| $T_s - T_w$ °C. | 44 | 42.4 | 40.6 | 39 |
| Ambient temperature °C. | 19 | 24.5 | 29 | 34.5 |
| Air volume flow rate at inlet cfm | 31.7 | 41.1 | 45 | 49.3 |

One interesting fact which emerges from these tests is that the metal composite roof panel can provide greater ventilation at 30° inclination that the GRP composite panel at 40° inclination—see Tables 2 and 7. This fact, coupled with a reduction in $T_w$, suggests that shallower-pitch metal roofs are better heat insulators and ventilators than steeper-pitch GRP roofs. So long, therefore, as maximum performance, or other factors such as easier shedding of water or snow, do not dictate a steeper panel inclination, the shallower the pitch of a metalpanelled roof offers economies of material. At the same time, where a roof ridge runs east-west, it becomes more credible to mount convection panels on the north-facing pitch as well as on the south-facing pitch.

Figure 17:
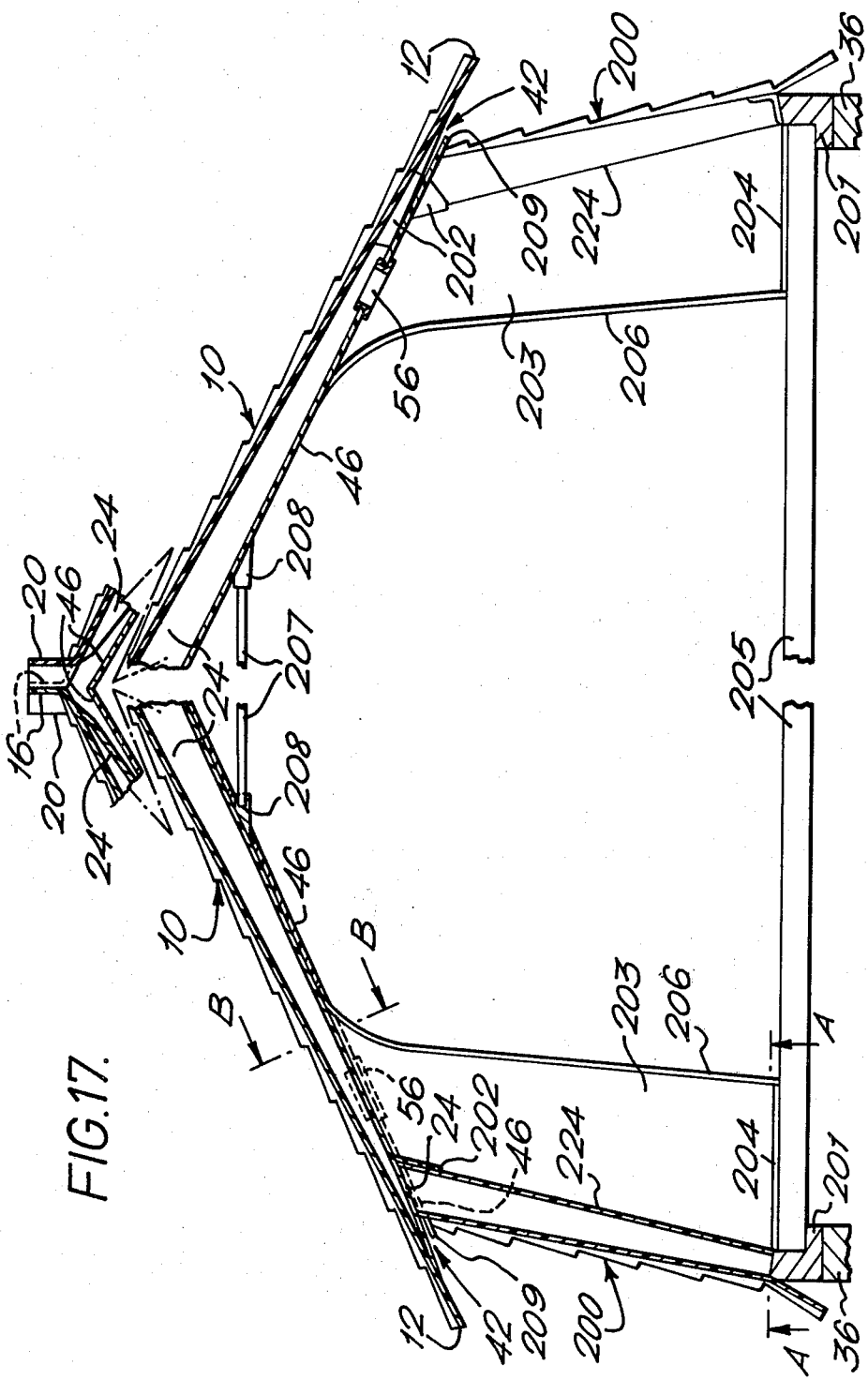
FIG. 17 is a composite transverse section through a mansard-type variant of the roofs shown in FIGS. 1-8, the left-hand half of the Figure being a section taken through a stiffening beam (equivalent to the section of FIG. 2 or FIG. 5) while the right-hand half is a section taken between adjacent stiffening beams (equivalent to the section of FIG. 7)

It is to be understood that, although in the preceding description and the drawings it has been assumed that each pitch of a roof will be spanned by a unitary panel structure 10, the invention is not restricted to such a situation. Thus, where a roof pitch is larger than can conveniently be spanned by a single unitary panel 10, lower and upper panel sections can be arranged to abut end-to-end so that, after assembly, the elongated structure behaves as an integral panel unit. Furthermore, for constructional convenience during assembly on site, the upper end of the lower panel section (equivalent to the ridge line 14 of a single panel 10) and the lower end of the upper panel section (equivalent to the eaves line 12 of a single panel 10) can be formed with upstanding flanges for securing the sections together.

Where the distance to be spanned from eaves to ridge is somewhat, but not considerably, greater than can be spanned by the greatest convenient length of single panel 10, the extra span length can be achieved by adopting the mansard roof configuration shown in FIG. 17.

For example, taking a roof pitch of 30° to the horizontal and using currently available GRP materials, an optimum value of weight/strength for on-site conventional handling results in a maximum eaves-ridge span, measuring horizontally, for a single panel 10 (FIGS. 1–6) of about 9 ft. 6 in. A double panel made up as described above by butting two single panels 10 end-to-end results in an average minimum eaves-ridge span of about 18 ft. 6 in. Assuming a conventional symmetrical roof pattern, these figures give wall-to-wall spans of 19 ft. (single panel) and 37 ft. (double panel) respectively. By adopting the mansard roof configuration, however, and varying the angle of inclination of the steep panel 200 (FIG. 17) and its slant height, a useful intermediate range of wall-to-wall spans can be achieved. Thus, using the above maximum single panel at 10 in FIG. 17, a slant height for the steep panel 200 of a maximum of 5 ft., and an angle of inclination to the vertical of 10°, the mansard roof structure of FIG. 17 can have a wall-to-wall span of 30 ft. The slant height of the panel 200 cannot safely exceed 5 feet with currently available materials because of the high stresses encountered at the "knee" of the roof where the panels 10 and 200 meet.

Figure 18:
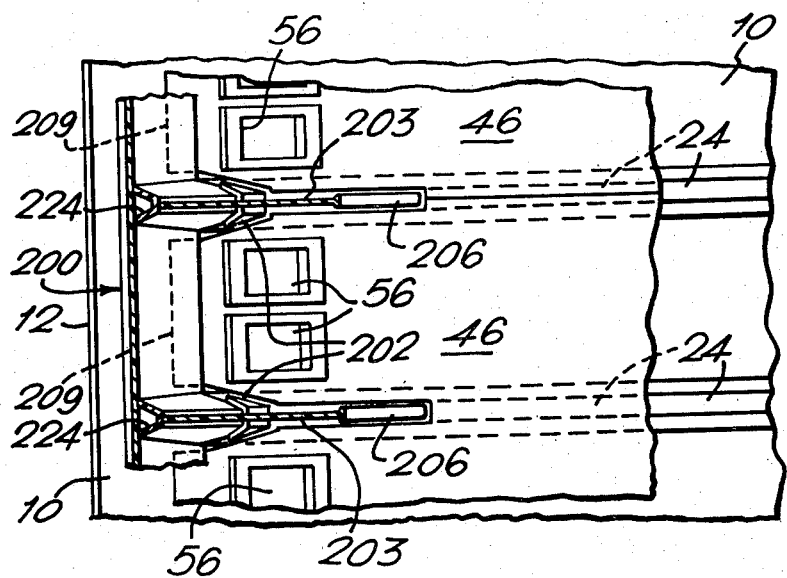
FIG. 18 is a fragmentary section on the line A—A of FIG. 17.
Figure 19:
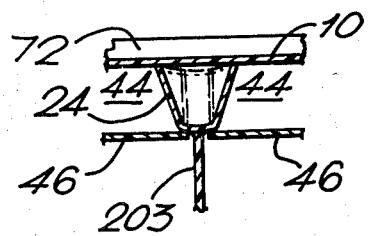
FIG. 19 is a fragmentary section on the line B—B of FIG. 17.

Referring now in detail to FIGS. 17–19, main regular GRP convection panels 10 (FIGS. 1–6) are shown meeting at the castellated ridge flanges 16, 20. At their "eaves" ends 12 the panels 10 are supported on respective steeply angled and relatively short panels 200 each of which is constructed similarly to the main panels 10 except that they do not include liners 46. The stiffening beam 224 of each short panel 200 is stepped at its lower end on an L-section lintel 201 securely mounted on the top edge of the side wall 36. At its upper end, each stiffening beam 224 straddles and is bonded to the counterpart stiffening beam 24 of the ventilated panel 10. This joint may if desired be strengthened by an overlay 202.

The "knee" formed by the junction of the panels 10, 200 is further strengthened by a vertical gusset plate 203 whose upper edge is bonded to the crest of the stiffening beam 24 of the panel 10 and whose outer edge is bonded to the crest of the stiffening beam 224 of the short panel 200. The lower edge of the vertical gusset plate 203 is flanged at 204 and secured to a rafter or tie-beam 205, or equivalent floor or ceiling structure, which spans horizontally the gap between the side walls 36 and is anchored at each end in the notch of the L-section lintel 201. The inward edge of the vertical gusset plate 203 is reinforced by a flange or bead 206.

Optionally, a tie-rod 207 may be anchored at each end in brackets 208 which are attached or built into a stiffening beam 24 on each panel 10 at a level intermediate the roof flange 16 and the junction between the beam 24 and the vertical gusset plate 203. The purpose of this tie-rod 207 is to reduce the spreading load which the mansard roof assembly would otherwise exert on the rafter or ceiling structure 205.

The ventilating function of the roof is achieved by bridging the crests of adjacent stiffening beams 24 of the roof panels 10 by a liner or baffle 46 similar to that previously described with reference to FIGS. 1–6 to form the tunnels or ducts 44. Each liner 46 may span one pair of adjacent beams 24 as shown in FIGS. 18 and 19, or it may bridge three or more beams according to preference. At the ridge end each liner 46 meets its counterpart on the other pitch of the roof to form an upwardly convex continuous joint. At the "eaves" end, each liner 46 has ventilation inlet ports 56 (FIG. 18) to afford communication between the space under the mansard roof and the tunnel or duct 44. Each liner 46 is cut away so as to embrace the joint between the stiffening beam 24 and both the vertical gusset plate 203 and the short beam 224 to terminate at 209 externally of the outer skin of the short panel 200. The latter terminates under the liner 46 so as to leave an air inlet slot 42 to each tunnel or duct 44 between adjacent beams 24. The liner 46 is also cut away to embrace the bracket 208 when provided.

The mansard design of roof described with reference to FIG. 17 functions exactly as the roof design of FIGS. 1–6 or FIGS. 7 and 8, the steeply-inclined panels 200 serving to effectively reduce the width of the building at the "eaves" ends 12 of the panels 10 compared with the width between the walls 36.

What is claimed is:

1. A roofing panel for a building including at least one flank wall having a top, said building further including a ridge and a roof having a slant height between said top and said ridge, and eaves being formed on the roofing panel at the top of the flank wall, said roofing panel comprising an outer skin of an inert structural material for spanning from said eaves to said ridge;
    a fixing formation at the ridge and adapted to engage a counterpart formation on a similar panel and being provided with a valley whereby to define a ventilation gap between the panels;
    an integral longitudinal stiffening beam on the underside of said outer skin extending substantially from the eaves to the ridge;
    a generally flat inner liner of impervious sheet material sealed along a pair of longitudinal lines to said outer skin and spaced therefrom by engagement with said longitudinal stiffening beams so as to form a substantially unobstructed tunnel between said outer skin and said inner liner extending from substantially the eaves to the ridge, and
    means for sealing the inner liners to a counterpart liner on said similar panel.

2. A roofing panel as claimed in claim 1 wherein said fixing formation at the ridge end of said outer skin is an upstanding flange of corrugated form in plan so as to alternately make face to face contact with and to diverge from the counterpart flange on said similar panel, said divergences constituting ventilation gaps.

3. A roofing panel as claimed in claim 1 wherein said fixing formation is an upstanding rectilinear flange offset back from the ridge, and further comprising spacer means for interengagement at intervals along the said flange with a counterpart flange on said similar panel, intervals between successive spacer means constituting ventilation gaps.

4. A roofing panel as claimed in claim 1 comprising at least two stiffening beams, said inner liner spanning the said stiffening beams.

5. A roofing panel as claimed in claim 4 wherein said inner liner is of channel shape in transverse cross-section and includes longitudinal flanges constituting the said beams.

6. A roofing panel as claimed in claim 4 wherein said inner liner terminates short of the eaves by a distance not greater than the distance by which said panel is adopted to overlap the flank wall so as to provide an access opening from outside said building to said tunnel.

7. A roofing panel as claimed in claim 4 wherein said inner liner is provided with a port opening located inboard of the flank wall of the building to afford an access opening to said tunnel from the interior of said building, and further comprising a damper controlling said port to differentially control the flow of air through said tunnel between the outside atmosphere and the interior of said building.

8. A roofing panel as claimed in claim 7 comprising a second damper to complete closure of one of said access opening while permitting variable obturation of the other.

9. A roofing panel as claimed in claim 1 comprising a hollow box girder fixed transversely to the underside of each said stiffening beam adjacent the eaves to register with and rest upon the top of the flank wall, and wherein the corresponding end of said inner liner is sealed to said girder.

10. A roofing panel as claimed in claim 9 wherein said box girder is provided with has an aperture through which concrete can be introduced into its hollow interior.

11. A roofing panel as claimed in claim 10 wherein each end of said box girder is formed to engage in substantially fluid-tight manner the adjacent end of a counterpart girder on a laterally adjacent panel.

12. A roofing panel for a building including at least one flank wall having a top, said building further including a ridge and a roof having slant height between said top and said ridge, an eaves being formed on the roofing panel at the top of the flank wall, said roofing panel comprising
an outer skin of glass-fibre-reinforced plastic moulded to simulate a roof tile pattern;
at least two integral reinforcing beams on the underside of said skin and adapted for extending from the eaves to the ridge;
an inner liner of substantially flat relatively stiff air-impervious material sealed to said reinforcing beams and extending longitudinally from adjacent the eaves to substantially the ridge;
said inner liner being spaced from the underside of said outer skin at all points so as to define, with the sides of said reinforcing beams, a tunnel open at each end;
an upstanding ridge flange on said outer skin having a castellated shape in plan adapted to engage and be secured to a complementarily castellated ridge flange on a similar panel on the side of the ridge, and
means for sealing said inner liner to a counterpart liner on said similar panel.

13. A roofing panel as claimed in claim 12 comprising damper means for controlling the air flow through said tunnel.

14. A roofing panel as claimed in claim 13 comprising a transverse hollow box girder extending across the reinforcing beams for the full width of the panel adjacent the eaves so as to register with and rest upon the top of the flank wall.

15. A roofing panel as claimed in claim 14 wherein the outer wall of said box girder is extended downwards below the level of the base thereof to form a fixing flange for bolting to said building flank wall.

16. A roofing panel as claimed in claim 15 wherein the base of said box girder extends inwards to form a fixing flange for a ceiling structure within the building.

17. A pitched roof having substantially flat oppositely inclined roof pitches which meet at their respective apexes along the line of the roof ridge wherein:
each pitch is composed of a series of laterally abutting main roofing panels each having on the underside thereof an internal longitudinal stiffening beam extending substantially between the eaves and ridge ends of said main panel;
each said main panel being secured at its ridge end to the corresponding end of a counterpart main panel on the opposite pitch in such a way as to provide a ventilating gap between the apexes of said panels for the exhaust therethrough to atmosphere of air convected upwards to said line of the roof ridge;
at least one of said main panels has an inner impervious liner spaced from the underside thereof and sealed at laterally spaced intervals along continuous longitudinal lines to the underside of said panel whereby to form a tunnel open at its eaves and ridge ends to provide through communication with atmosphere at a ventilation gap; and
the main panels on each pitch are stepped adjacent their eaves ends on respective supporting panels of shorter length and steeper pitch to constitute a mansard roof assembly.

18. A pitched roof as claimed in claim 17 wherein each junction between the main and supporting panels is strengthened by a gusset plate secured to the underside of the said main and supporting panels and resting on a rafter or like transverse member spanning the distance between the flank walls of the building.

19. A pitched roof as claimed in claim 17 wherein the supporting panels are constructed similarly to the main panels except that they are not provided with liners.

20. A roofing panel for a building including at least one flank wall having a top, said building further including a ridge and a roof having a slant height between said top and said ridge, an eaves being formed on the roofing panel at the top of the flank wall, said roofing panel comprising an outer skin of sheet metal of a length at least equal to said slant height between the top of the flank wall and the ridge of the roof;
a fixing formation on said skin at the ridge and adapted to meet and be secured to a similar counterpart panel located on the opposite side of said ridge, said fixing formation being provide with a valley whereby to define, in conjunction with said counterpart panel, a ventilation gap between said panels;

an integral longitudinal stiffening beam on the underside of said outer skin extending substantially from the eaves to the ridge;

a generally flat, inner, sheet-metal liner sealed in airtight relation to the underside of said outer skin along spaced substantially parallel longitudinal lines and spaced from said skin at least between the flank wall and the ridge so as to form an open-ended tunnel extending from the outside of said building at the eaves to said ridge, said liner having spaced ends one of which is adjacent said ridge; and means for sealing the end of said liner to said counterpart panel.

21. A roofing panel as claimed in claim 20 wherein said liner provided with an inlet port located adjacent and inwards of said flank wall to provide communication between the interior of the building and the tunnel.

22. A roofing panel as claimed in claim 21 comprising a damper controlling each of the access apertures to said tunnel constituted by the open end thereof at the eaves and said inlet port.

23. A roofing panel as claimed in claim 20 wherein the external surface of said outer skin is patterned, as by stamping or embossing, to represent a conventional tiled roof.

24. A roofing panel as claimed in claim 20 having a pair of laterally spaced longitudinal stiffening beams and said inner sheet metal liner spans the gap between said beams.

25. A roofing panel as claimed in claim 24 wherein each longitudinal stiffening beam is of straight generally I-section metal strip having one generally straight edge contoured to fit snugly against and be sealed in airtight manner to the underside of said outer skin and the longitudinal edges of said inner liner are sealed in airtight manner to the inward-facing surfaces of the webs of each I-section.

26. A roofing panel as claimed in claim 25 wherein the depth of each longitudinal stiffening beam tapers from a minimum at the eaves and ridge to a maximum at approximately mid-span of said panel, but said inner liner maintains a constant distance from the mean plane of said outer skin.

27. A pitched roof having oppositely sloping pitches on each side of an intermediate roof ridge line wherein each pitch is constituted by laterally abutting panels as claimed in claims 1 or 12, and the inner liners of each pair of panels on opposite pitches which meet at said ridge abut and are sealed in airtight manner to each other so as to afford open communication between the respective tunnels and the ventilation gaps between the oppositely sloping outer skins.

28. A roofing panel for a building including at least one flank wall having a top, said building further including a ridge and a roof having a slant height between said top and said ridge, an eaves being formed on the roofing panel at the top of the flank wall, said roofing panel comprising an outer skin of sheet metal of a length at least equal to said slant height between the top of the flank wall and the ridge of the roof;

a fixing formation on said skin at the ridge and adapted to meet and be secured to a similar counterpart panel located on the opposite side of said ridge, said fixing formation being provided with a valley whereby to define, in conjunction with said counterpart panel, a ventilation gap between said panels;

an integral longitudinal stiffening beam on the underside of said outer skin extending substantially from the eaves to the ridge;

a generally flat, inner, sheet-metal liner sealed in airtight relation to the underside of said outer skin along spaced substantially parallel longitudinal lines and spanced from said skin at least between the flank wall and the ridge so as to form an open-ended tunnel extending from the outside of said building at the eaves to said ridge, said liner having spaced ends one of which is adjacent said ridge;

means for selectively introducing air into said tunnel from atmosphere or from within said building at a point adjacent said flank wall; and means for constraining air thus introduced into the tunnel to exhaust to atmosphere via said ventilation gap.

* * * * *